Jan. 7, 1941.  C. M. CAVE, JR  2,227,532
AUTOMATIC CONTROL MEANS
Filed July 31, 1939  2 Sheets-Sheet 1
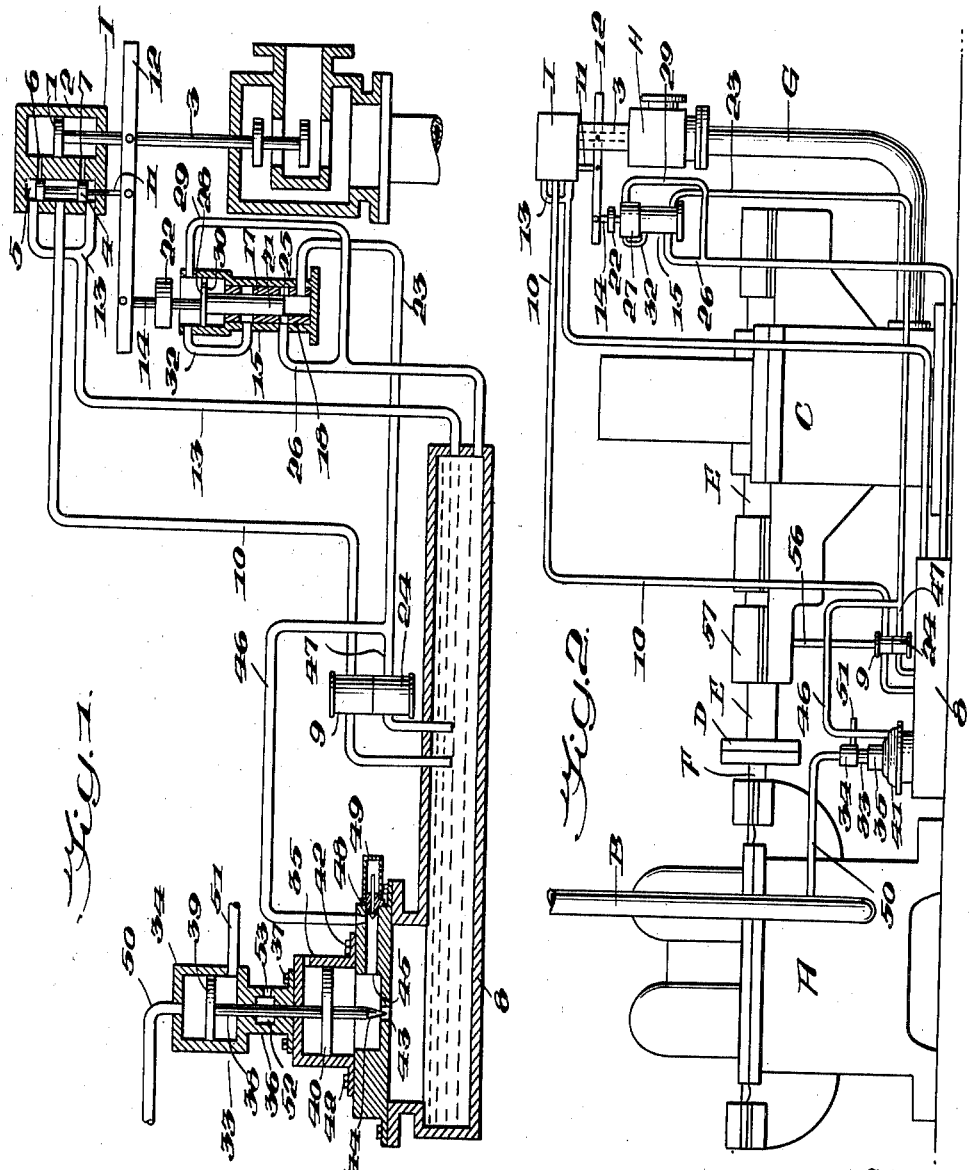
Inventor
CHANNING M. CAVE, JR.,
By Richard E. Babcock
Attorney Jan. 7, 1941. C. M. CAVE, JR 2,227,532
AUTOMATIC CONTROL MEANS
Filed July 31, 1939 2 Sheets-Sheet 2
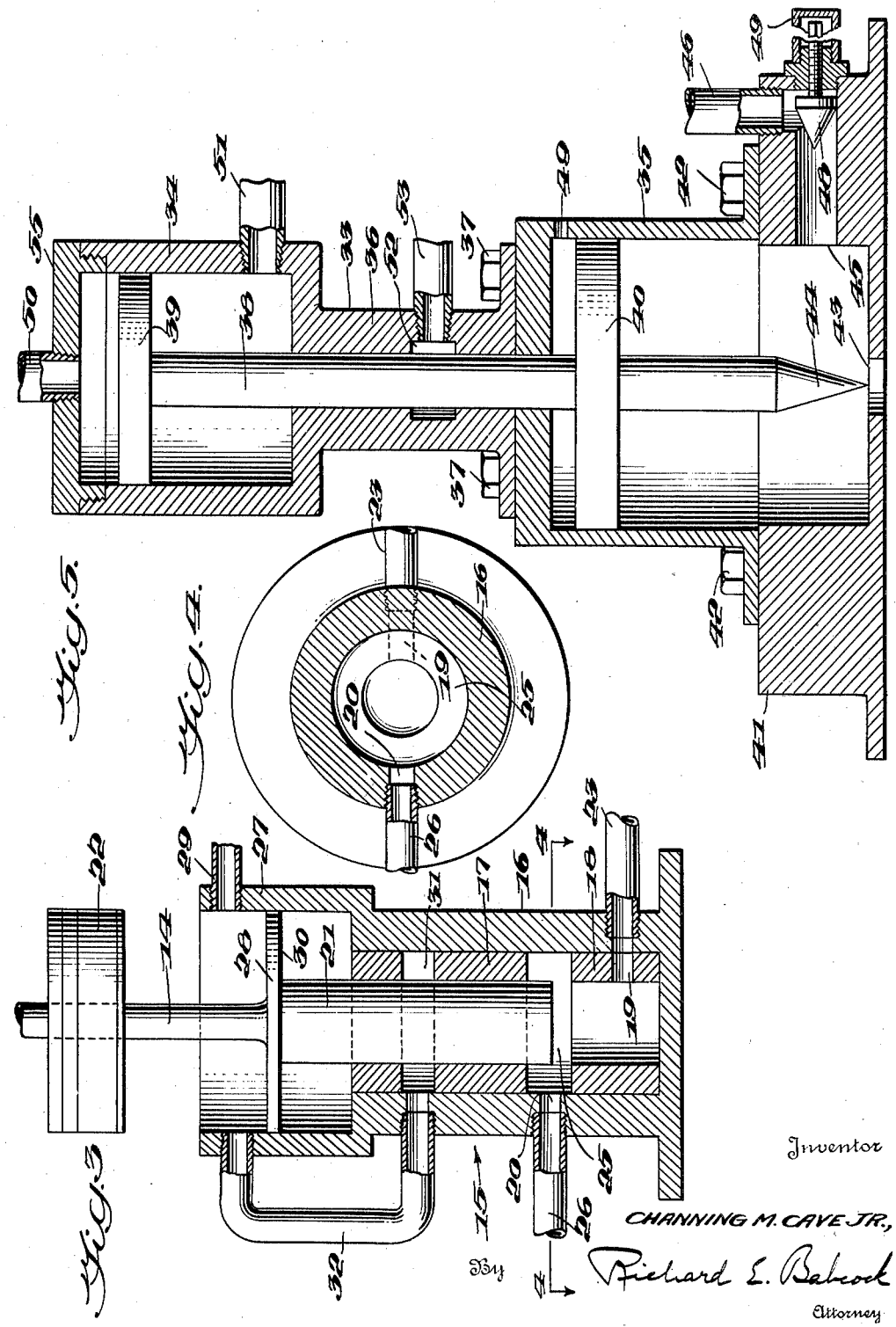

Patented Jan. 7, 1941

2,227,532

UNITED STATES PATENT OFFICE 2,227,532

AUTOMATIC CONTROL MEANS

Channing M. Cave, Jr., Bogalusa, La.

Application July 31, 1939, Serial No. 287,675

16 Claims. (Cl. 103—19)

This invention relates to automatic control means for controlling the speed of the prime mover driving pumps or compressors, and thereby causing the said prime mover to change its rotating speed in response to a change in pressure delivered by the pump or compressor.

This controlled pressure can be either constant or differential, and it is the purpose of the invention to deliver either of the two pressures without changing the construction of the said invention.

This invention is particularly adapted for use in boiler feed systems by controlling the speed of the prime mover driving the boiler feed pump so that an increase in speed will deliver a larger quantity at a given pressure while a decrease in speed will deliver a smaller quantity at a given pressure. This given pressure being constant or differential.

When a constant pressure is being maintained the pressure has a fixed value regardless of change of any other pressure it may have opposing it, as, in the case of boiler feeding, the pressure is maintained at a constant value above the boiler pressure.

When a differential pressure is being maintained, as in the case of boiler feeding, a definite pressure is maintained above the boiler pressure. When the boiler pressure drops the feed pressure drops an equal amount, and when the boiler pressure rises the feed pressure rises an equal amount also.

The prime mover is any machine that derives a rotating motion from the flow of gases, liquids or steam, and this rotating motion is transmitted to the pump or compressor in the form of rotating power causing the pump or compressor to utilize this rotating power for the purpose of compressing liquids, gases or steam at a constant or differential pressure, and it is the purpose of my invention to control the flow of gas, liquid or steam to the prime mover so that the prime mover will cause the pump or compressor to deliver its compressed element at a constant or differential value.

As stated, this invention is particularly adapted for use in boiler feed systems by regulating the speed of the turbine driving the boiler feed pump so as to maintain the feed water at a constant pressure relative to boiler steam pressure, or a constant pressure regardless of boiler steam pressure though it may be used in various other fluid pumping or compressing systems whenever, by the action of a pump or compressor, it is desired to maintain one fluid at a substantially constant pressure with respect to another fluid pressure, or by maintaining a constant pressure without respect to other fluid pressures, by increasing or decreasing the pump speed in accordance with variations in differential pressure between the two said fluid pressures or a constant pressure without respect to another fluid pressure.

In such feed water systems, the feed water is generally supplied to the boiler by means of a feed water pump operated by a steam turbine or other fluid pressure motor. The boiler is fitted with valves or other means which open automatically, or manually, to allow feed water to enter the boiler to maintain the water level therein to the proper height, and the varying demand for water from the pump causes a varying pressure in the feed water line or conduit if the pump motor or turbine is running at a constant speed. Due to the fact that the feed water can be forced into the boiler only at a pressure greater than the boiler pressure, it is impractical to use a feed pump that allows the pressure to vary when the same pump will deliver a constant pressure by varying its speed in response to a demand for more or less water, since the demand for water may become so great as to cause the feed water pressure to drop to an inefficient pressure making it impossible to supply feed water to the boiler at a volume sufficient to maintain a constant water level in the boiler. In addition to the varying demand for feed water, another factor to be considered is the variation in steam pressure within the boiler, since obviously such pressure may become too high, with consequent reduction in flow of the feed water, or else the boiler steam pressure may drop to a very low point allowing the feed water pump to run at an excessive and uneconomical rate of speed due to this increased differential between feed water and steam pressure. In either case the automatic devices have to readjust themselves or the hand controls have to be changed to suit each change in steam pressure condition in an effort to maintain a constant water level in the boiler.

The invention has been developed with the foregoing considerations in view, and has for its primary object to provide automatic control means particularly adapted for use in a boiler feed water system to control a substantially constant boiler feed water pressure in excess of the steam pressure, decreasing the feed water pressure when the steam pressure decreases and increasing said feed water pressure when the steam pressure rises, or either maintaining a constant feed water pressure regardless of the change in steam pressure; to provide as part of my invention a volume control unit disposed to control the speed of a pump or compressor turbine, and in which the amount of controlling action varies directly in accordance with the volume of flow of liquid through said unit; and to provide a pressure control actuated by the difference between two fluid pressures, or a constant pressure to vary the volume of fluid flowing through said volume control unit.

In this application I show and describe only the preferred embodiment of my invention simply by way of illustration of the practice of my invention, as by law required. However, I recognize that my invention is capable of other and different embodiments, and the various details thereof may be modified in various ways all without departing from my said invention; therefore, the drawings and description herein are to be considered as merely illustrative and not exclusive.

In the accompanying drawings:

Figure 1 represents a diagrammatic sectional view of my invention;

Figure 2, a side elevation of my invention as applied to a boiler feed water system;

Figure 3, an enlarged vertical section of the pressure control unit of my invention;

Figure 4, a section on the line 4—4 of Figure 3, looking in the direction of the arrows; and, Figure 5, an enlarged vertical section of the volume control unit of my invention.

Referring now in detail to the accompanying drawings, wherein for purposes of illustration I have shown my invention applied to the feed water system of a boiler, the letter A designates any usual and well known form of feed water pump, which supplies feed water under pressure through a feed water supply pipe or conduit B to a boiler or series of boilers (not shown), to maintain the water in said boiler at the proper level.

The pump A may be driven by any suitable motor, such as the usual steam turbine C in driving engagement with said pump A in such a manner that the pump speed is proportional to the turbine speed. Such driving engagement may be by means of a coupling or clutch D connecting the turbine drive shaft E with the pump shaft F.

Also driven by said turbine, at a speed proportional thereto, are a pair of preferably gear type or other suitable type of pumps 9 and 24, mounted one beneath the other and driven by a common drive shaft 56 extending into a gear box or housing 57 mounted on turbine C, to receive rotary motion from turbine shaft E through a suitably arranged set of gears (not shown) or other usual transmission means disposed in said case 57 in any usual and well known manner.

Steam is supplied to turbine C by a steam inlet pipe or conduit G provided with a usual well known steam admission valve H to control the supply of steam to, and consequently the speed of, the turbine C.

Adjustment of admission valve H may be caused by suitable hydraulic control means preferably comprising a usual hydraulic governor unit or mechanism such as I having a piston 1 mounted for reciprocation in a cylinder 2 and connected to the valve stem 3 of admission valve H which stem slidably snugly extends through the bottom of cylinder 2 to make a fluid tight fit.

The position of piston 1 of the governor unit may be controlled by means of a pilot valve 4 constituting part of the governor unit and disposed in a chamber 5 having passages or ports 6 and 7 communicating with the top and bottom respectively of cylinder 2.

Oil under pressure will preferably be supplied to chamber or valve chamber 5 from a fluid tank or container 8 by means of the usual gear type oil pump or other suitable means 9 hereinbefore mentioned. It is to be noted of course that the oil supply pipe 10 from the pump 9 enters the chamber 5 at its central portion. Normally, in inoperative position, the valve 4 closes ports 6 and 7, but may be moved up or down by means of a stem 11 pivotally connected to the floating lever 12, hereinafter more fully described.

When pilot valve 4 is moved downwardly by means of its stem 11 to open ports 6 and 7 it may be seen that oil under pressure will pass through lower port 7 into the lower part of cylinder 2, forcing piston 1 upwardly to open admission valve H wider, while at the same time any oil in the upper part of cylinder 2 will be forced outward through the upper port 6 into the upper portion of pilot valve chamber 5 and through the upper branch of a suitable drain pipe or conduit 13 back into the oil supply tank 8, it being noted that when the valve 4 is moved downwardly the upper portion of said chamber 5 is shut off from the remainder thereof and serves as a connecting conduit between upper port 6 and the discharge pipe 13.

It is thought to be apparent that when the position of pilot valve 4 is reversed, or in other words when said valve is moved upwardly, the operation is just the reverse, the oil entering the upper portion of cylinder 2 to force piston 1 downwardly, closing the admission valve H and leaving the lower portion of said cylinder 2 through the lower port 7 and the lower branch of drain or return pipe 13.

The hereinbefore mentioned floating lever 12 of the hydraulic governor I, and such as has heretofore been employed in hydraulic governor and similar devices, is pivotally connected at its medial portion to the pilot valve stem 11, and is pivotally connected adjacent its ends to admission valve stem 3 and to the stem or spindle 14 of a volume control unit 15 forming part of my invention, said volume control until 15 being adapted to actuate the lever 12 in order to adjust the position of admission valve H in accordance with the volume of oil or other fluid flowing through said unit 15.

As clearly illustrated in Figure 3 of the drawings, the aforementioned volume control unit 15 of my invention consists essentially of a casing 16 preferably cylindrical in form, having a pair of circular or annular spaced upper and lower bushings 17 and 18 respectively. An inlet port 19 is provided in the lower portion of cylinder 1 to admit oil or other fluid into the lower portion of said cylinder, and an outlet port 20 is provided at some point opening into the annular space between bushings 17 and 18. Snugly slidably disposed for reciprocation through said bushings 17 and 18 is a plunger or piston 21 having the preferably integral upwardly projecting stem 14 attached to and carried by its upper portion, said stem being pivotally connected at its upper end to floating lever 12, as hereinbefore described and as clearly shown in Figures 1 and 2. Mounted in any suitable fashion on the stem 14 is a weight or weights 22, serving to force the plunger down and maintaining a constant fixed pressure thereon.

In the operation of unit 15 oil is supplied from tank 8 through supply pipe 23 by means of a suitable pump 24 disposed in said pipe 23, said oil entering the lower portion of cylinder 16 through inlet port 19 and flowing upward to the annular space or chamber 25 from whence it is discharged through discharge port 20. From discharge port 20 the oil is returned to the tank 8 through a return or discharge or drain pipe 26 to complete its circuit of flow.

It may be seen that the weight 22 pressing plunger 21 down upon the oil in the lower portion of the cylinder 16 of unit 15 maintains said oil at a constant given pressure, equal to the total weight of the plunger 21 and weight 22, and that accordingly the position of plunger 21 varies only in accordance with the volume of oil flowing through the unit 15 in a given time. Or in other words, as the plunger 21 moves up or down, its lower edge moves toward or away from the upper edge of cylindrical bushing 18 to form a variable constriction in the oil circuit flowing through the control unit 15. Since the plunger 21 is pressed down under a constant given weight, serving to maintain the oil at a constant given pressure, the position of plunger 21 will vary in accordance with the volume of oil flowing through said unit. For instance an increase in the volume of oil will force plunger 21 upwards to enlarge the constriction formed by the adjacent edges of plunger 21 and bushing 18, while a decrease in the volume of oil flowing through unit 15 will allow the plunger to descend to decrease the size of the constriction and thus maintain the oil pressure constant.

The foregoing description of the volume control unit of my invention includes the primary essential elements thereof. However, in addition to the aforementioned essential elements it is desirable to provide a suitable dash pot arrangement to retard the movement of plunger 21 in order to prevent any objectionable overcontrolling or hunting action thereof, which action is a common defect in many control or governor devices. Such a dash pot or dash pot arrangement will preferably be in the form of a cylindrical container or cylinder 27 integral with and forming part of the unit 15. Disposed in said container 27 is a piston 28 fixedly carried by stem 14 for movement therewith. The cylinder 27 is maintained nearly full of oil or other fluid so that the oil fills all space above and below piston 28, preferably up to the level of drain 29, and piston 28 is formed with a small orifice 30 extending therethrough so that during downward movement of said piston the oil under it must be displaced through said hole or orifice to retard the movement of the piston 28. During upward movement of piston 28 a vacuum is created thereunder and the oil that has been displaced through orifice 30 has to return through said orifice, thus retarding the upward movement of said piston 28.

In order to keep cylinder 27 supplied with the proper amount of oil it is desirable though not essential to provide an oil trap or basin 31 immediately above cylindrical bushing 17 to catch oil which is forced upward from the lower portion of unit 15 between the walls of the plunger 21 and bushing 17 respectively. The oil trap or basin 31 may be connected by means of a pipe 32 to supply oil overflowing therefrom to the cylinder or container 27 of the dash pot. The overflow oil from the dash pot may be conducted back to the oil tank 8 by means of a drain pipe 29.

In order to control the rate of flow of fluid through the volume control unit 15 I provide a pressure control unit 33 so constructed and arranged as to vary the flow of oil through volume control unit 15 in accordance with the varying differential pressure between the boiler steam pressure and the feed water pressure or a varying constant pressure from feed water pump A, the varying flow through unit 15, by moving lever 12 and consequently adjusting admission valve H, permitting the proper amount of steam to be supplied to pump turbine C to drive pump A at the necessary speed to maintain the feed water pressure at a constant excess over the boiler steam pressure, or at a constant pressure regardless of steam pressure.

The pressure control unit or mechanism of my invention, generally designated by the numeral 33, and which is shown in detail in Figure 5 of the drawings, consists primarily of a pair of cylinders 34 and 35 fixedly maintained in alignment with their axis extending in parallel directions, preferably by means of an axially bored connecting neck or member 36 which if desired may be formed integral with the upper or differential pressure cylinder 34 and firmly attached to the lower or fluid pressure cylinder 35 by usual known means such as bolts 37.

Extending preferably coaxially through both of said cylinders 34 and 35 and preferably snugly slidably extending through the bore of neck or trap member 36 is a conically pointed piston rod or stem 38 on which are fixedly spacedly mounted, as by shrinking, set screws, etc., a pair of pistons 39 and 40, said pistons being disposed for reciprocation in their respective cylinders 34 and 35 and in operation being always disposed in corresponding positions in their respective cylinders 34 and 35 by the action of their common piston rod 38.

Preferably the lower cylinder 35 is open at its lower end and mounted at said lower end on a suitable base or foundation plate 41 by bolts or other suitable means 42. Formed in the base 41 is a hole or bore or aperture 43 of suitable shape and size to removably receive and cooperate with a conically pointed needle valve or valve member 44 carried by the lower piston 40, which may consist of the conically pointed end 44 of piston rod 38 as shown in the drawings, to form a variable aperture or outlet which may be opened or closed by upward or downward movement respectively of said rod 38. Also means such as the intake port 45 preferably formed in the side of base 41 are provided for allowing fluid under pressure to enter cylinder 35 beneath piston 40, the fluid, such as oil, being conveyed to the inlet 45 by means of a conduit or pipe 46 from the oil pump 24, it being noted that pipe 46 and pipe 23 to the volume control means 15 both branch off from a common pipe section 47 through which fluid is supplied by the pump 24.

In the operation of lower cylinder 35 the oil flows into the lower part of the cylinder through inlet port 45 and flows out through the variable opening 43 in base 41 back to tank 8 at a rate of speed dependent on the position of the conical point or needle valve 44 of rod 38, it being noted that the pressure control unit 33 is preferably mounted directly on tank 8 so that oil flowing through hole 43 returns directly into said tank 8.

If desired, suitable means such as the valve or cock 48 provided with a protecting cap or cover 49 removably screwed thereover may be disposed in the inlet port 45, or at some other suitable point to regulate the flow of oil into the lower cylinder 35, for the purpose of constant speed governing when so desired.

In order to permit free reciprocation of piston 40 in said lower cylinder 35 it is desirable to form a small aperture 49 in the upper part of the cylinder 35 to allow the entrance and escape of air and oil therefrom.

The upper cylinder 34 is provided with a feed water inlet or pipe 50 opening into the top portion thereof and a boiler steam inlet or pipe 51 opening into the lower portion thereof, the feed water inlet 50 supplying water at feed water pressure from the feed water supply pipe B to exert downward pressure on piston 39, and the boiler steam inlet 51 supplying steam at boiler pressure from the boiler (not shown) to exert upward pressure on said piston 39 the aforedescribed pressures and connections to function on piston 39 for the purpose of maintaining a differential pressure control.

When operated as a constant pressure control the upper cylinder 34 is provided with a feed water inlet or pipe 50 opening into the top portion thereof and a pipe 51 opening into the lower portion thereof, the feed water inlet 50 supplying water at feed water pressure from the feed water pipe B to exert downward pressure on piston 39, and the pipe 51 draining all seepage of water between the adjacent walls of the piston 39 and the cylinder 34 to the atmosphere and for the purpose of maintaining atmospheric pressure under piston 39.

It is necessary to form the connecting neck 36 of unit 33 with an internal cavity or trap 52 and a drain 53 from said trap 52 to permit steam or water seeping down between the adjacent walls of rod 38 and neck 36 from the cylinder 34 to drain off without entering the lower cylinder 35 and mixing with the oil therein.

Also, in the form illustrated in Figure 5, the upper cylinder 34 is provided with a removable preferably screw-threaded cap or cover 55 to permit easy assembly and inspection of the unit 33.

It may be seen that the unit 33 as above described may be easily and quickly assembled by connecting together the two cylinders 34 and 35 by means of the usual bolts 37, inserting the piston rod 38 through the bore of neck 36, applying the pistons 39 and 40 thereto, and thereafter attaching the base 41 and screw-cap 55 to cylinders 35 and 34 respectively.

It may be seen from the foregoing description and the accompanying drawings that the pistons 39 and 40 are so proportioned with respect to each other and arranged in their respective cylinders that in the operation of the pressure control unit 33 a relatively small oil pressure beneath the piston 40 normally balances the differential pressure between the boiler steam and feed water acting in opposition to each other on piston 39.

It may also be seen from the foregoing description and accompanying drawings that the pistons 39 and 40 are so proportioned with respect to each other and arranged in their respective cylinders that in the operation of the pressure control unit 33 a relatively small oil pressure beneath the piston 40 normally balances the feed water pressure exerting a downward pressure on piston 39.

The operation of the pressure control unit 33 in combination with the volume control unit 15 is as follows.

Normally the turbine C operates at a constant speed to supply feed water to the boiler at a constant pressure, with the pressure control 33, volume control 15, and hydraulic control means I, all in balanced or neutral position, as shown in Figure 1 of the drawings.

However, if the boiler steam pressure increases, or if the feed water pressure decreases due to a demand for a greater volume of feed water in the boiler, the oil pressure beneath piston 40 forces the pistons 39 and 40 and their piston rod 38 upwards out of balanced position.

The upward movement of said pistons 39 and 40 and piston rod 38, by moving the conical end or needle valve 44 upwards enlarges the effective area of the cooperating opening or aperture 43, thus allowing the volume of oil flowing therethrough to increase. As the volume of oil flowing through pressure control unit 33 increases, due to said upward movement of the needle valve 44, the oil pressure beneath piston 40 decreases until the pistons 39 and 40 reach a new position of equilibrium wherein the oil pressure beneath piston 40 equals the differential of the steam pressure and feed water pressure on the upper piston 39.

It may be seen that the increase in the volume of oil or other fluid flowing through pressure control unit 33 causes a decrease in the volume of oil flowing through volume control unit 15, since oil is supplied to both units 15 and 33 by the common oil pump 24.

Accordingly the decreased volume of oil flowing through volume control unit 15 permits the plunger 21 to drop, as hereinbefore described, the stem 14 of said unit 15 pivotally moving the end of lever 12 downward about its point of pivotal connection to valve stem 3 of turbine admission valve H. Said downward movement of lever 12 causes downward movement of pilot valve 5, uncovering or partially uncovering inlet port 7 to permit oil to enter the lower part of cylinder 2, moving piston I upwardly and opening admission valve H to permit more steam to enter therethrough.

Upward movement of the piston I causes upward swinging of the lever 12 about its point of pivotal connection to stem 14 of volume control unit 15, and thus serves to return the pilot valve 4 to normal closed position, leaving the valve H in its new position of adjustment.

At the same time the increased volume of steam admitted through admission valve H speeds up the turbine C and accordingly results in increased speed of the feed water pump A and oil pumps 9 and 24, restoring the oil pressure in cylinder 35 to normal and proportionately increasing the feed water pressure to balance said oil pressure.

If the demand for feed water decreases, causing an increased feed water pressure, or if the steam pressure in the boiler decreases, in either event the forces acting on pistons 39 and 40 will become unbalanced and the operation of the device will be just the reverse of that hereinbefore described. Or in other words pistons 39 and 40 will be forced downwardly gradually shutting off the flow of fluid through outlet aperture 43 and building up the oil pressure beneath the piston 40 until a new position of balance or equilibrium is reached. The increased oil pressure and consequent decreased volume of flow of oil through pressure control unit 33 results in an increased volume of flow through volume control unit 15, raising plunger 21 and stem 14 to tilt lever 12 upwardly and consequently actuating pilot valve 4 to permit oil to flow into the upper part of cylinder 2 to force piston 1 downwardly and partly shut off or close the steam admission valve H to the turbine C. The downward movement of stem 3 swings lever 12 downwardly about its point of pivotal connection with the stem 14 of volume control unit 15, and thus serves to return the pilot valve 4 to normal closed position, while at the same time the partial closing of steam admission valve H slows up the turbine C and the feed water pump A and oil pumps 9 and 24 driven thereby, thus decreasing the oil pressure to return it to normal while at the same time proportionately decreasing the feed water pressure to maintain said volume control unit 33 in its newly attained position of balance.

It should be particularly noted that in the preferred form of the invention the taper of the conical needle valve 44 of unit 33 and the speed ratio of the turbine C, oil pump 24, and water pump A are preferably such that whenever the oil pressure is changed in cylinder 35 due to movement of the pistons 39 and 40, the changed volume of flow of oil through unit 15 will affect said unit 15 so as to change the speed of turbine C and consequently oil pump 24 just sufficiently to restore the oil pressure in pressure control unit 33 to normal. Since the oil pressure is thus always restored to the same constant pressure, to balance the difference between the feed water and steam pressures, it may be seen that when used in connection with a boiler feed water system my invention serves to always maintain the feed water at a constant pressure above the boiler steam pressure, dropping the feed water pressure when the steam pressure drops and increasing the feed water pressure when the steam pressure rises.

Although for purposes of illustration I have shown and described my invention as used in connection with a boiler feed water system, my invention is not limited to such use, but may equally well be used for other purposes, as in fluid compressing systems, to regulate the speed of the compressor motor in accordance with the internal pressure in the compression tank, and also to compensate for varying volume demands for the compressed fluid, by regulating the speed of the compressor motor in accordance with the pressure in the output conduit of the pump or compressor.

In the drawings it will be noted that for purposes of simplicity and convenience, the two oil pumps 9 and 24 are shown as being driven by a common driving shaft 56 at a speed proportional to the speed of the turbine or pump motor C. However, it is not essential that the pump 9 be driven from the shaft 56, nor that said pump be driven at a speed proportional to the turbine speed, nor even that a pump be used, it being sufficient that some means preferably independent of the pump 24 be provided for supplying operating fluid under pressure to the control unit I in the manner hereinbefore described. It is preferred that any such fluid supply means for the unit I be separate from the pump 24 so that when the pilot valve 4 of said unit I opens, the sudden drop in pressure in the oil supply line thereto will not affect the pressure responsive unit 33 of the invention, as would be the case if oil were supplied to both units I and 33 by a common pump or means.

I claim:

1. Automatic control means particularly adapted for use in boiler feed water systems wherein feed water under pressure is supplied to a boiler by means of a turbine driven feed water pump the speed of which is controlled by a hydraulic governor actuated admission valve, comprising a volume control unit, a pressure control unit, a pump disposed to pump fluid through both of said units, and means for driving said pump at a speed proportional to the speed of said feed water pump, said volume control unit being disposed to actuate the hydraulic governor of said admission valve to vary the speed of said turbine in accordance with the volume of flow of fluid through said volume control unit, and said pressure control unit being acted upon by the boiler steam pressure and feed water pressure from said feed water pump to vary the volume of flow of fluid through said volume control unit according to variations of differential pressure between said boiler pressure and said feed water pressure.

2. Automatic control means particularly adapted for use in boiler feed systems wherein feed water under pressure is supplied to a boiler by means of a turbine driven feed water pump the speed of which is controlled by a hydraulic governor actuated admission valve, comprising a volume control unit, a pressure control unit, a pump disposed to pump fluid through both of said units, and means for driving said pump at a speed proportional to the speed of said feed water pump, said volume control unit being disposed to actuate the hydraulic governor of said admission valve to vary the speed of said turbine in accordance with the volume of flow of liquid through said volume control unit, and said pressure control unit being acted upon by the feed water pressure from said feed water pump to vary the volume of flow of fluid through said volume control unit according to variations of constant pressure of said feed water pressure.

3. Automatic control means particularly adapted for use in fluid supply systems wherein fluid under pressure is supplied to a container by motor driven fluid supply means the speed of which is controlled by a hydraulic governor actuated admission valve, comprising a volume control unit, a pressure control unit, and a pump disposed to pump liquid through both of said units, said volume control unit being disposed to actuate the hydraulic governor of said admission valve to vary the speed of said driving motor in accordance with the volume of fluid flowing through said volume control unit, and said pressure control unit being acted upon by the fluid pressure from said container in opposition to the fluid output pressure from said motor driven fluid supply means to vary the volume of flow of fluid through said volume control unit according to variations of difference between the fluid pressure from said container and the fluid output pressure from said supply means.

4. Automatic control means particularly adapted for use in fluid supply systems wherein fluid under pressure is supplied to a container by motor driven fluid supply means the speed of which is controlled by a hydraulic governor actuated admission valve, comprising a volume control unit, a pressure control unit and a pump disposed to pump liquid through both of said units, said volume control unit being disposed to actuate the hydraulic governor of said admission valve to vary the speed of said driving motor in accordance with the volume of fluid flowing through said volume control unit, and said pressure control unit being acted upon by the fluid pressure from said motor driven fluid supply means to vary the flow of fluid through said volume control unit according to variations of fluid pressure from said supply means.

5. Automatic control means comprising a volume control unit, a pressure control unit, and a fluid pump circulating fluid through both of said units, said volume control unit comprising an apertured member through which flows fluid from said pump, in combination with a weighted plunger mounted for reciprocation with its end in registry with the aperture of said member to be raised or lowered in accordance with the volume of fluid flowing through said aperture; and said pressure control unit comprising a cylinder formed with fluid inlet and outlet ports through which flows fluid from said pump, said outlet port being disposed in the end of said cylinder, a piston disposed for reciprocation in said cylinder, and a needle valve carried by said piston to by moving in and out of said outlet port during reciprocation of said piston vary the proportionate volume of fluid flowing through said pressure control means from said pump and consequently varying the volume of flow of fluid through said volume control unit.

6. Automatic control means comprising a volume control unit, a pressure control unit, and a pump circulating fluid through both of said units, said volume control unit comprising an apertured member through which flows fluid from said pump, in combination with a weighted plunger mounted for reciprocation with its end in registry with the aperture of said member to be raised or lowered in accordance with the volume of fluid flowing through said aperture; and said pressure control unit comprising a cylinder formed with fluid inlet and outlet ports through which flows fluid from said pump, one of said ports being disposed in the end of said cylinder, and a piston disposed for reciprocation in said cylinder, in combination with a needle valve carried by said piston for movement in and out of said last mentioned port during reciprocation of said piston.

7. Automatic control means comprising a cylindrical casing having fluid inlet and outlet ports respectively opening into the lower and medial portions thereof, and axially spaced annular bushings disposed in said casing above and below said outlet port respectively, in combination with a weighted plunger disposed for reciprocation through said upper bushing with its lower end adjacent the upper face of said lower bushing and obstructing the opening in said lower bushing to during the reciprocation of said plunger responsive to variations in the volume of fluid flowing through said casing provide a variable constriction through which said fluid must pass, while maintaining said fluid at a constant pressure.

8. Automatic control means comprising a pair of cylinders connected together in axially aligned relationship, one of said cylinders being provided with a fluid inlet port adjacent its bottom and a fluid outlet aperture in its bottom, and the other of said cylinders being formed with fluid ports adjacent its respective ends, in combination with pistons disposed for reciprocation in said respective cylinders, a common piston rod snugly slidably passing through the adjacent ends of said cylinders and connected to the pistons disposed therein for reciprocation therewith to maintain said pistons at all times in corresponding positions in their respective cylinders, and a needle valve carried by the piston in said first mentioned cylinder, said needle valve extending axially toward and being in registry with the fluid outlet aperture formed in the bottom of said cylinder to during reciprocation of said piston to move into and out of said outlet aperture to vary the effective size thereof.

9. Automatic control means comprising a pair of cylinders connected together in axially aligned relationship, one of said cylinders being provided with a fluid inlet port adjacent its end and a fluid outlet aperture in said end, and the other of said cylinders being formed with fluid ports adjacent its respectiev ends, in combination with pistons disposed for reciprocation in said respective cylinders, a common piston rod connecting said pistons and disposed for reciprocation with said pistons to maintain said pistons at all times in corresponding positions in their respective cylinders, and a needle valve carried by the piston in said first mentioned cylinder, said needle valve extending axially toward and being in registry with the fluid outlet aperture of said cylinder to during reciprocation of said piston move into and out of said outlet aperture to vary the effective size thereof.

10. Automatic control means comprising a lower cylinder formed with a medially disposed fluid outlet aperture in its bottom and a fluid port adjacent its bottom, an upper cylinder formed with fluid ports at its respective end portions, said upper cylinder being rigidly connected to said lower cylinder in axial alignment therewith, pistons disposed for reciprocation in said respective cylinders, a common piston rod extending axially into each of said cylinders through the respective adjacent ends thereof and rigidly attached to said pistons to maintain the same at all times in corresponding positions in their respective cylinders, and a needle valve mounted on the lower face of the lower piston and extending axially downwardly to during reciprocation of said piston move into and out of said outlet aperture to vary the effective size thereof.

11. Automatic control means comprising a pair of cylinders disposed in axially aligned relationship, pistons disposed for reciprocation in said respective cylinders, and a common piston rod extending between and connecting said pistons to reciprocate therewith and maintain said pistons at all times in corresponding positions in their respective cylinders, in combination with a needle valve carried by one of said pistons, said needle valve extending axially toward and being in registry with a fluid outlet aperture formed in the adjacent end of its respective cylinder to during reciprocation of said piston move into and out of said aperture to vary the effective size thereof.

12. Automatic control means comprising a pair of axially aligned cylinders, pistons disposed for reciprocation in said respective cylinders, and a piston rod extending between and connecting said pistons to at all times maintain said pistons in constant spaced relationship, in combination with a needle valve carried by one of said pistons for reciprocation therewith in its respective cylinder, said valve extending toward and being in registry with a fluid outlet aperture formed in the adjacent end of its respective cylinder.

13. Automatic control means particularly adapted for use in boiler feed water systems wherein feed water under pressure is supplied to a boiler by means of a turbine driven feed water pump the speed of which is controlled by a fluid admission valve, comprising a volume control unit, a pressure control unit, and means driven at a speed proportional to the speed of said feed water pump for forcing fluid through both of said units, said volume control unit being disposed to cause actuation of said admission valve to vary the speed of said turbine in accordance with the volume of flow of fluid through said volume control unit, and said pressure control unit being acted upon by the boiler steam pressure and feed water pressure to vary the volume of flow of fluid through said volume control unit according to variations of differential pressure between said boiler pressure and said feed water pressure.

14. Automatic control means particularly adapted for use in fluid supply systems wherein fluid under pressure is supplied to a container by motor driven fluid supply the speed of which is controlled by a fluid admission valve, comprising a volume control unit, a pressure control unit, and means for forcing fluid through both of said units, said volume control unit being disposed to actuate said admission valve to vary the speed of said driving motor in accordance with the volume of fluid flowing through said volume control unit, and said pressure control unit being acted upon by the fluid pressure from said container in opposition to the fluid output pressure from said motor driven fluid supply means to vary the volume of flow of fluid through said volume control unit according to variations of difference between the fluid pressure from said container and the fluid output pressure from said supply means.

15. Automatic control means comprising a pair of cylinders, pistons disposed for reciprocation in said respective cylinders, and means extending between said pistons to at all times maintain said pistons in constant relatively spaced relationship, in combination with a needle valve carried by one of said pistons for reciprocation therewith in its respective cylinder, said valve extending toward and being in registry with a fluid outlet aperture formed in the adjacent end of its respective cylinder to during reciprocation of said piston move into and out of said aperture to vary the effective size thereof.

16. Automatic control means comprising a cylinder formed with a fluid inlet port adjacent its lower end and means for supplying a continuous flow of fluid into said cylinder through said inlet port, a piston disposed for reciprocation in said cylinder above said inlet port, and means for exerting varying degrees of downward pressure on said piston, in combination with a downwardly disposed needle valve carried by said piston for reciprocation therewith in said cylinder, said needle valve being disposed for movement through a fluid outlet aperture formed in the lower end of said cylinder during movement of said piston responsive to variations in the downward pressure exerted thereon to vary the rate of escape of fluid through said outlet port so as to at all times maintain the fluid pressure beneath said cylinder equal to the downward pressure exerted thereon.

CHANNING M. CAVE, Jr.